Patented Apr. 24, 1945

2,374,367

UNITED STATES PATENT OFFICE 2,374,367

PROCESS FOR PREPARING THERAPEUTICALLY ACTIVE SUBSTANCES

Randolph T. Major, Mountainside, and Howard T. Bonnett, Westfield, N. J., assignors to Merck & Co., Inc., Rahway, N. J., a corporation of New Jersey No Drawing. Original application January 30, 1940, Serial No. 316,404. Divided and this application May 22, 1943, Serial No. 488,058

3 Claims. (Cl. 260—482)

This application is a division of our co-pending application Serial No. 316,404, filed January 30, 1940, issued as U. S. Patent No. 2,322,375, dated June 22, 1943.

This invention relates to an improved process for the production of salts of carbaminoyl choline and carbaminoyl substituted-cholines, having the formula

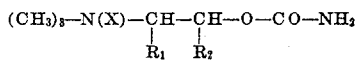

where $R_1$ and $R_2$ may be selected from the group consisting of alkyl radicals and hydrogen, and X is a halogen radical.

Such carbaminoyl choline and carbaminoyl substituted-choline salts are of therapeutic interest because of the effects which they exhibit upon the blood pressure.

Essentially, the process of our invention comprises treating a choline salt or a substituted-choline salt, such as an $\alpha$- or $\beta$-methylcholine salt, with phosgene and ammonia in an inert organic media, and, after appropriate working up, recovering the corresponding carbaminoyl derivative.

The carbaminoyl choline and carbaminoyl substituted-choline salts may be prepared directly from corresponding choline or substituted-choline salts.

Also, salts of acids the silver salts of which are more soluble than silver iodide may be prepared from carbaminoyl choline or carbaminoyl substituted-choline iodides by treating the latter with the selected silver salt.

The following examples are given as illustrative of the processes and products of our invention. It will be obvious to those skilled in the art that various modifications may be made therein without departing from the spirit and scope of the invention described and claimed.

Example I

About 3 gms. of $\beta$-methylcholine chloride are stirred at room temperature with an excess of phosgene dissolved in 50 gms. of chloroform, for about two hours. Excess phosgene and hydrochloric acid are removed by distillation under vacuo. Additional chloroform is added to the syrup and the mixture is poured into excess ammonia dissolved in chloroform and cooled in solid carbon dioxide-acetone. The solid is filtered and extracted with hot absolute alcohol. The solid in the alcohol is precipitated with ether, filtered, and recrystallized from isopropanol. The carbaminoyl-$\beta$-methylcholine chloride obtained has a melting point of about 220° C.

Example II

About 14 gms. of choline chloride are stirred with a solution of about 20 gms. of phosgene in 100 gms. of chloroform for about two hours at room temperature. The mixture becomes a two-phase liquid mixture. Hydrochloric acid and excess phosgene are removed by distillation in vacuo. Chloroform is added to the syrup, and the mixture is then added to a solution of excess ammonia in chloroform which was cooled with solid carbon dioxide-acetone. The mixture is filtered, and the solid is extracted with hot absolute alcohol. The solid in the alcoholic solution is precipitated with ether, and filtered. It is recrystallized from a methyl alcohol-ether mixture; the carbaminoyl-choline chloride obtained has a melting point of about 208–210° C.

Example III

About 2 gms. of $\alpha$-methylcholine chloride are stirred with excess phosgene dissolved in chloroform for about two hours at room temperature. Excess phosgene and hydrochloric acid are removed by distillation in vacuo. Chloroform is added to the remaining syrup and the mixture is added to a solution of ammonia in absolute alcohol. The mixture thus obtained is filtered and the solid in the filtrate is precipitated with ether and recrystallized. The carbaminoyl-$\alpha$-methylcholine chloride obtained has a melting point of about 185–188° C.

Carbaminoyl-$\beta$-methylcholine iodide may also be prepared by first preparing carbaminoyl dimethylaminoisopropanol and then reacting the latter with methyl iodide as shown in the following example:

Example IV

About 20 gms. of dimethylaminoisopropanol are added to a solution of about 25 gms. of phosgene in about 200 cc. of chloroform with stirring and cooling. Hydrogen chloride and excess phosgene are evaporated off. Additional chloroform is added and the mixture is added to a cold solution of ammonia in chloroform. After about two hours, about 100 cc. of water are added and the aqueous solution saturated with potassium carbonate. The mixture is separated, and the aqueous solution extracted with ether. The chloroform and ether mixture is dried with anhydrous potassium carbonate and distilled. The urethane of dimethylaminodiisopropanol is distilled at about 30 mm. pressure and about 139–140° C.

To about 2 gms. of the urethane of dimethylaminoisopropanol, about 2 gms. of methyliodide are added. The carbaminoyl-β-methylcholine iodide may be recrystallized from acetone-ether mixture. It melts at about 190.5-192° C.

Carbaminoyl-α-methylcholine iodide may be similarly prepared by starting with 2-dimethylaminopropanol.

We claim:

1. The process comprising reacting a substance selected from the group consisting of dimethylamino-isopropanol and 2-dimethylamino propanol with phosgene in chloroform, thereafter reacting with ammonia in chloroform, and treating the reaction product with methyl iodide.

2. The process comprising reacting dimethylaminoisopropanol with phosgene in chloroform, thereafter reacting with ammonia in chloroform, and treating the reaction product with methyl iodide.

3. The process comprising reacting 2-dimethylamino propanol with phosgene in chloroform, thereafter reacting with ammonia in chloroform, and treating the reaction product with methyl iodide.

RANDOLPH T. MAJOR.
HOWARD T. BONNETT.

CERTIFICATE OF CORRECTION.

Patent No. 2,374,367. April 24, 1945.

RANDOLPH T. MAJOR, ET AL.

It is hereby certified that error appears in the printed specification of the above numbered patent requiring correction as follows: Page 1, second column, line 52, Example IV, for "dimethylaminodiisopropanol" read --dimethylaminoisopropanol--; and that the said Letters Patent should be read with this correction therein that the same may conform to the record or the case in the Patent Office.

Signed and sealed this 21st day of August, A. D. 1945.

Leslie Frazer (Seal)                First Assistant Commissioner of Patents.